United States Patent [19]

Shawhan

[11] 3,914,694

[45] Oct. 21, 1975

[54] FREQUENCY MODULATION CIRCUIT

[75] Inventor: Elbert N. Shawhan, West Chester, Pa.

[73] Assignee: Sun Oil Company of Pennsylvania, Philadelphia, Pa.

[22] Filed: Sept. 12, 1973

[21] Appl. No.: 396,628

[52] U.S. Cl. ................................ 325/145; 325/16 R

[51] Int. Cl.[2] ........................................ H04B 1/04

[58] Field of Search ........... 325/125, 126, 145, 148, 325/159, 181, 184, 45, 163, 30; 330/85, 86, 109, 10; 332/16 R, 16 T, 18, 19, 27; 340/207 P, 208; 331/135, 136; 178/66 R, 66 A

[56] References Cited

UNITED STATES PATENTS

| | | | |
|---|---|---|---|
| 3,070,773 | 12/1962 | Woolston et al. | 340/208 |
| 3,262,073 | 7/1966 | Willett | 325/145 |
| 3,277,398 | 10/1966 | Brigham | 332/27 |
| 3,300,736 | 1/1967 | Tanaka | 325/145 |
| 3,585,518 | 6/1971 | Hitt | 330/85 |
| 3,714,588 | 1/1973 | Deboo et al. | 330/109 |
| 3,783,411 | 1/1974 | Libby | 330/109 |
| 3,835,419 | 9/1974 | Milne et al. | 332/16 R |

OTHER PUBLICATIONS

Doyle, "FET and OP-AMP Audio Circuits," Radio-Electronics, July 1970, pp. 46–49.

*Primary Examiner*—Robert L. Griffin
*Assistant Examiner*—Jin F. Ng
*Attorney, Agent, or Firm*—George L. Church; Donald R. Johnson

[57] ABSTRACT

A first operational amplifier, used as an active filter tuned to a predetermined carrier frequency, is connected in a loop circuit with a second operational amplifier, used as a saturable amplifier. A square wave is generated by the saturable amplifier and is passed by the filter to develop a sine wave at the filter output. This sine wave carrier is modulated in frequency by a modulating signal applied to the gate of a field-effect-transistor which is connected across the input of the filter.

6 Claims, 1 Drawing Figure

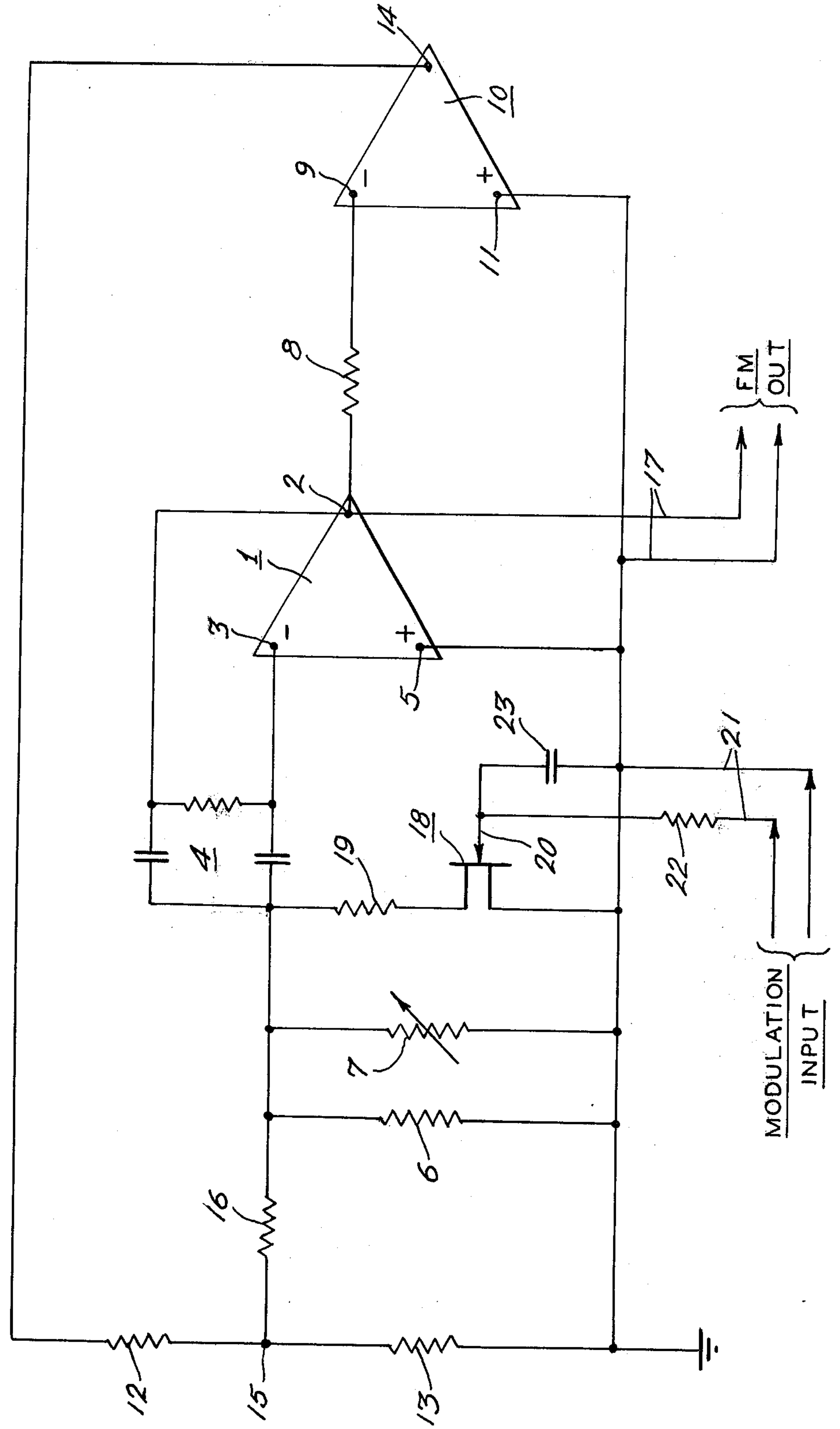
FM OUT
MODULATION INPUT

FREQUENCY MODULATION CIRCUIT

This invention relates to a frequency modulation circuit, operable in the audio frequency range, which is particularly simple and compact in construction.

In my copending U.S. Pat. application, Ser. No. 390,833, filed Aug. 23, 1973, there is disclosed a borehole telemetry system employing a frequency modulated (e.g., frequency shift keyed) acoustic (sonic) carrier which is transmitted along the drill pipe (drill string) from the bottom of the hole to the surface, the purpose being the transmission of information (data) from downhole to the surface. Such a system calls for a frequency modulator, located downhole, for generating an acoustic carrier and for frequency modulating the same. A frequency modulator for this use must be simple, compact, and low in power consumption.

An object of this invention is to provide a novel frequency modulation circuit.

Another object is to provide a frequency modulator which is eminently suitable for use in a downhole environment.

A further object is to provide a frequency modulator which is relatively simple and compact.

A still further object is to provide a novel frequency modulator using solid-state devices (specifically, operational amplifiers).

Still another object is to provide a novel frequency modulator which consumes very little power.

A detailed description of the invention follows, taken in conjunction with the accompanying drawing, wherein the single FIGURE is a schematic diagram of a frequency modulation circuit according to the invention.

In the drawing, power supply connections have been omitted, for purposes of simplification. The power demand of the circuit of this invention is six milliamperes from a ±12 volts d.c. supply.

A first solid-state operational amplifier 1, manufactured as an integrated circuit or IC, has its output 2 connected to its inverting input 3 by way of an RC network 4 having such characteristics as to cause the IC 1 to operate as an active filter tuned to a predetermined carrier frequency in the audio range, such as 1,000 Hz, for example. The noninverting input 5 of filter 1 is connected to a reference potential (ground), and a fixed resistor 6 and a variable resistor 7 are both coupled (as far as alternating currents are concerned) between input 3 and ground, that is, across the input 3, 5 of filter 1. The frequency to which the active filter 1 is tuned may be manually varied by adjusting the resistor 7.

The output at 2 of filter 1 is coupled over a resistor 8 to the inverting input 9 of a second solid-state operational amplifier 10, operating as a saturable amplifier. The non-inverting input 11 of the IC 10 is connected to ground. A voltage divider, comprising two series-connected resistors 12 and 13, is connected from the output 14 of amplifier 10 to ground, and the common terminal 15 of resistors 12 and 13 is connected through a resistor 16 to the ungrounded ends of the paralleled resistors 6 and 7, and thus (for alternating currents) to the input 3 of the active filter 1.

In operation, a pulse originating in the filter 1 (such as might be produced, for example, in the form of a transient, when power is first applied to operational amplifier 1) drives the IC 10 to saturation, generating a square wave of constant amplitude at carrier frequency. This square wave, appearing at the output 14 of IC 10, is applied to the input of the filter 1, by way of elements 12, 16, etc. The fundamental of the square wave is passed by the filter 1 and applied by way of element 8 back to the input of the IC 10, thus sustaining the oscillations. In other words, an oscillatory loop is formed by the two ICs and the connections previously described, resulting in sustained oscillations.

The fundamental of the square wave is passed by the filter (IC 1), so a sine wave is developed at the output 2 of this filter, which wave may be taken off by a pair of leads 17 one of which is connected to output terminal 2 and the other of which is connected to ground. Since the amplitude of the square wave and the gain of the IC 1 are fixed, no gain control circuit is required to maintain a constant-amplitude sine-wave output.

As previously mentioned, the frequency to which the active filter 1 is tuned (and, thus, the carrier frequency output at 2) is varied by adjusting the resistor 7. The current-carrying electrodes of a field-effect-transistor (FET) 18 are connected in series with a resistor 19, this combination being connected in parallel with the frequency-adjusting resistor 7. A modulation input signal is utilized to vary the potential on the gate 20 of the FET 18. Such an input signal is applied to the gate electrode 20 of the FET by way of a pair of leads 21, one of which is coupled to the gate 20 over a resistor 22 and the other of which is grounded. A capacitor 23 is connected between gate electrode 20 and ground. A modulation input signal which is applied in the form of a potential to the FET gate 20, changes the resistance of the FET (which latter is in parallel with the resistor 7). Thus, the FET 18 frequency modulates the carrier in response to the modulation input at 21. The "FM Out" signal is taken off by means of leads 17. The modulating frequency at 21 can be between 2 and 50 Hz, by way of example.

With the circuit of this invention, a 100-millivolt (RMS) signal applied to 21 develops maximum frequency deviation. Distortion and amplitude modulation are negligible with the circuit of the invention.

The invention claimed is:

1. A frequency modulation circuit comprising: differential amplifier means having first and second inputs and an output, a filter having an input and an output, said output being connected to the first input of the amplifier means and said filter being tuned to a predetermined carrier frequency, resistor means connected to the input of the filter for manually tuning the frequency of the filter, feedback loop means connecting the output of the amplifier means to the input of the filter and including a voltage divider, a modulation input, a modulation-voltage-responsive continuously variable impedance connected to the modulation input, the second input of said amplifier means, and the input of said said filter to vary the tuning thereof, and frequency-modulated-wave output connections coupled to the filter output.

2. Circuit according to claim 1, wherein said amplifier means is a solid-state operational amplifier.

3. Circuit of claim 1, wherein said filter is an active filter.

4. Circuit of claim 1, wherein said filter comprises a solid-state operational amplifier.

5. Circuit according to claim 1, wherein said continuously variable impedance comprises a field-effect-transistor having two current-carrying electrodes and a control electrode, wherein one of said current-carrying electrodes is connected to the input of said filter.

6. Circuit of claim 1, wherein the amplifier means comprises a solid-state operational amplifier operating as a saturable amplifier, and wherein said filter comprises a solid-state operational amplifier.

* * * * *